3,042,586
PURIFICATION OF STREPTOKINASE
Malcolm Siegel and Gabriel Palombo, Concord, N.H., and Werner Baumgarten, North Hills, Pa., assignors to Merck & Co., Inc., Rahway, N.J., a corporation of New Jersey
No Drawing. Filed Sept. 29, 1959, Ser. No. 843,062
4 Claims. (Cl. 195—66)

This invention is concerned with the preparation of streptokinase and particularly with a method of purification of crude streptokinase.

Streptokinase is a fermentation product of hemolytic streptococci. It was established some time ago that it plays a role in the dissolution of blood clots and particularly of exudates which are rich in fibrin components. Depending on the nature and size of these clots, streptokinase or streptokinase in the presence of human plasminogen effects the dissolution of such clots. Heretofore, the use of streptokinase (and plasmin prepared from plasminogen and streptokinase) has been limited due to the fact that streptokinase has been contaminated with streptococcal protein by-products which gave rise to toxic reactions in man. These reactions manifest themselves by increase in body temperature, fall in blood pressure, shaking, chills, anoxia, cyanosis, and the like.

A feature of the present invention is that it is now possible to eliminate the contaminating proteins from the streptokinase preparation and to obtain a highly purified streptokinase. Our invention relates mainly to the methods involved in this purification. The consequent availability of highly purified streptokinase makes it possible to treat patients indiscriminately with streptokinase or with streptokinase activated plasminogen. This treatment has been found to be of unique importance in the treatment of a variety of diseases such as thrombophlebitis, phlebothrombosis, pulmonary embolism, coronary thrombosis, cerebral thrombosis, and the like.

The crude streptokinase which is purified in accordance with our invention, may be obtained by known procedures. In general this is accomplished by using *Streptococcus hemolyticus* as an inoculum on a growth medium and allowing bacterial growth to proceed for 8–10 hours. At that time, fermentation is stopped by passing the broth through cooling coils and the bacterial cells are removed by centrifugation or by filtration. The streptokinase may be isolated from the broth by the procedure set forth in U.S. Patent No. 2,666,729 or by any other known method. Usually, material isolated in this manner is from 15 to 60% pure as judged by physical methods of homogeneity. The present invention is concerned with the final purification of this partially purified product. This purification is accomplished by column chromatography on cellulose ion exchange resins of the kind described by Peterson and Sober (JACS 78:751, 1956). In our invention, we employed a phosphate buffer gradient for the elution of streptokinase. Generally speaking streptokinase in a phosphate buffer of low strength is adsorbed on the resin and thereafter is eluted by increasing the ionic strength of the buffer. Many of the impurities are adsorbed at the low ionic strength and are firmly bound to the resin so that the resulting streptokinase eluate solution is free of these substances. Other contaminants are not adsorbed to any extent and are found in the effluent.

By correctly choosing the phosphate buffer concentrations and the appropriate fraction, it is possible to obtain in excellent yield and in a simple manner, a highly purified streptokinase which has high therapeutic efficacy and is free of contaminants producing side reactions. Any commonly used phosphate buffer may be employed but it is preferable to use sodium or potassium phosphate.

To have the streptokinase become absorbed on the cellulosic resin it should be in a phosphate buffer having a molar concentration between 0.005 and 0.015 preferable about 0.010. To remove impurities from the resin, a phosphate buffer should be used which is within the molar concentration of 0.02 to 0.06. To elute the streptokinase a phosphate buffer having a molar concentration which is within the range of 0.06 to 0.15 should be used. Fractions having a molar concentration of from 0.06 to 0.08 will be found to have the most amounts of streptokinase.

A most suitable procedure for carrying out the above treatment of the resin with phosphate buffers of increasing strength is to flow through the column a phosphate buffer which has an initial molar concentration of 0.01 and to which is gradually added and mixed a phosphate buffer having a molar concentration of 0.15 or higher. In this way the molar concentration of the eluting buffer is continuously increased. The portion which passes through the column up to a molar concentration of 0.06 is discarded and the portion having a molar concentration above 0.06 and up to 0.15 is collected. Instead of the use of such a continuously increasing molar concentration, it is possible to successively wash the resin with separate buffers of increasing molar strength. For example, a first wash may be with a 0.02 M solution, then with a 0.04 M and then with a 0.06 M buffer, all of which will be discarded. The next higher molar concentrations, 0.07 M, 0.09, 0.15 will be collected as they will contain the highest amounts of streptokinase.

Some streptokinase will be found in the first eluting buffer of 0.06 M, and consequently a second wash at this same molar concentration may be carried out and collected as it will have an appreciable amount of streptokinase in it. Or it is possible to remove the impurities with a single buffer of 0.06 M concentration and to collect the streptokinase with a single buffer of say 0.08 M concentration although the yield of streptokinase will be relatively lower.

In the following examples DEAE cellulose is used but the invention may be practiced with other equivalent cellulosic resins such as TEAE, ECTEOLA cellulose, etc., described in the above journal article. A wide variety of phosphate buffers may be used as they are well known in the art and they may be chosen from the alkali and alkaline earth, mono, di or tri phosphate.

The invention will be clarified by the following examples:

EXAMPLE I

The example illustrates the purification of crude streptokinase by chromatography on DEAE cellulose resin prepared in accordance with the above journal article.

It is preferable to condition the resin prior to use, as follows. Four hundred grams of DEAE are suspended in 8 liters of $H_2O$ and the pH is adjusted to 2 with N HCl and NaCl is then added to bring the concentration to 5%. The mixture is filtered on cheesecloth and washed with 8 liters of 5% NaCl solution. The material is suspended in water and the pH adjusted to 10.5 with N NaOH and the NaCl concentration brought up to 5%, filtered and washed with 8 liters of 5% NaCl. The DEAE is again suspended and the pH adjusted to 3 with N HCl. Again the concentration is brought to 5% and the resin washed with 8 liters of 5% NaCl. Following this the DEAE is washed with 20 liters of pyrogen-free water and filtered.

The DEAE is suspended in the 0.01 M phosphate buffer and is agitated and allowed to settle several times to remove the fines. It is essential that the fines be removed in order to prepare columns with a suitable flow rate. The column described in this write-up has a flow of approximately 500 ml./hr. It is very desirable to stir up the column immediately before use in order to prevent separation of the solid from the glass surface.

A column 30 cm. long with an inside diameter of 52 mm. is charged with DEAE suspended in 0.01 phosphate buffer. Enough DEAE is added so that after settling a column of 6–7 cm. is formed.

The crude streptokinase solution is dialyzed against a phosphate buffer with the following composition (.005–.015 M, preferable .01 M):

Sol. A: Monobasic sodium phosphate, $NaH_2PO_4 \cdot H_2O$ —27.6 g./liter
Sol. B: Dibasic sodium phosphate, $Na_2HPO_4$—28.4 g./liter
16 ml. of A, 84 ml. of B: Diluted to 200 ml. with distilled water to yield a 0.1 M phosphate buffer, pH 7.5. This is then diluted to 0.01 M phosphate.

After equilibrium has been established, the streptokinase material is ready for purification. The establishment of equilibrium may be judged by measuring the electric resistance of the solution.

The streptokinase to be absorbed on the resin may be obtained commercially. The streptokinase, in a concentration of $10^6$ units/ml. or a total of $100 \times 10^6$ units dissolved in 100 ml. of water is dialyzed for 16–18 hours at 3° C. against two liters of 0.01 M phosphate buffer, pH 7.5. With the molarity of the effluent of .06 and .07 the major portion of streptokinase of high purity is eluted and appears in the effluent. The fractions are assayed for streptokinase content and for protein and the purity of the individual fractions are determined by calculating the specific activity, the units of streptokinase/gamma of nitrogen. The streptokinase rich fractions may be lyophilized or may be employed for conversion of plasminogen into plasmin.

EXAMPLE II

A DEAE column is prepared as in Example I and the resin is equilibrated with 0.08–0.12 M phosphate buffer, preferably .1 M. The crude streptokinase is dialyzed against 0.08–0.12 M phosphate buffer preferably 0.1 M. After equilibrium has been established, the streptokinase is introduced onto the column. Most of the impurities are retained on the column while the streptokinase solution appears in the effluent. The column is washed with 0.08–0.12 M phosphate buffer, preferably .1 M. The column is washed with this buffer again and the major portion of streptokinase is recovered in the effluent. It may then be used as given in Example I.

EXAMPLE III

*Preparation of column.*—A slurry was prepared of 1.5 g. of DEAE in 30 ml. of .005 M potassium phosphate buffer at pH 7.0. The slurry was poured into a chromatographic column (30 cm. height, 1 cm. inner diameter) equipped with a sealed disc and a capillary siphon. The resin was allowed to settle by gravity and then packed to ca. 15 cm. height by the application of air pressure (filtered air slightly above atmospheric pressure). A thin layer of cotton was placed above the resin in the column to protect it from mechanical disturbance. Packing of the column slows the flow rate through the column to 10–20 ml./hour.

*Placing sample on column.*—Crude streptokinase, approximately 250 mg. protein, was dissolved in about 15 ml. water and this was dialyzed in the cold (2–5° C.) against the .005 M phosphate buffer; then added to the column. The crude streptokinase solution was allowed to percolate (under the same slight pressure used in packing) through the column before addition of buffer of increasing ionic strength.

*Eluting from column.*—A continously increasing concentration of pH 7.0 potassium phosphate buffer was added to the column. The concentration gradient was obtained by the flow of 0.3 M potassium phosphate (pH 7.0) into a 250 ml. reservoir of .005 M buffer where it was mixed by magnetic stirring. Liquid from the mixing reservoir flowed through the column—the rate of flow through the column governing the rate of flow from the 0.3 M reservoir to the 250 ml. mixing reservoir. The hydrostatic head forcing buffer through the column could be varied by raising or lowering the buffer reservoir.

Each succeeding 10 ml. of eluate was collected in a separate tube. Assay for streptokinase content of the collecting tubes indicated that under these conditions the bulk of pure streptokinase was in the 100th to 150th ml. of eluate where the phosphate concentration varies from .07 to 0.12 M. At lower concentration of phosphate impurities in the crude streptokinase were eluted.

EXAMPLE IV

The process of Example IV was carried out using sodium phosphate buffer instead of potassium phosphate. The bulk of fine streptokinase was found to be in the 100th to the 150th ml. of eluate, as in Example III.

What is claimed is:

1. The method of purifying streptokinase which comprises bringing into contact with DEAE cellulose a solution of streptokinase in a phosphate buffer having a molar concentration of from 0.005 to 0.015, washing the cellulose with a phosphate buffer having a molar concentration between 0.02 and 0.06 to remove impurities, and removing streptokinase from the cellulose with a phosphate buffer having a molar concentration between 0.06 and 0.15.

2. The method of purifying streptokinase which comprises bringing into contact with DEAE cellulose a solution of streptokinase in a phosphate buffer having a molar concentration of 0.01, washing the cellulose with a phosphate buffer having a molar concentration of approximately 0.06 to remove impurities and removing streptokinase from the cellulose with a phosphate buffer having a molar concentration of about 0.08.

3. The method of purifying streptokinase which comprises bringing into contact with DEAE cellulose a solution of streptokinase in a phosphate buffer having a molar concentration of from 0.005 to 0.015, flowing through the cellulose a phosphate buffer the molar concentration of which progressively increases from 0.02 to 0.15 and collecting the portion between a molar concentration of 0.05 and 0.15.

4. The method of purifying streptokinase which comprises bringing into contact with DEAE cellulose a solution of streptokinase in a phosphate buffer having a molar concentration of from 0.005 to 0.015, removing the impurities with successive phosphate buffers which increase in molar concentration within the range 0.02 to 0.06, and removing the streptokinase with successsive phosphate buffers which increase in molar concentration within the range 0.06 to 0.15.

References Cited in the file of this patent
UNITED STATES PATENTS

| | | |
|---|---|---|
| 2,753,291 | Mowat et al. | July 3, 1956 |
| 2,997,425 | Singher et al. | Aug. 22, 1961 |

OTHER REFERENCES

Ion Exchangers in Organic & Biochemistry, pp. 320–338, Interscience Publishers Inc., N.Y., 1957.